HIGH EFFICIENCY TRAVELING WAVE TUBES

Filed Dec. 3, 1958

INVENTOR.
KERN K. N. CHANG
BY
William A. Zalesak
ATTORNEY

United States Patent Office 2,964,671

Patented Dec. 13, 1960

2,964,671

HIGH EFFICIENCY TRAVELING WAVE TUBES

Kern K. N. Chang, Princeton, N.J., assignor to Radio Corporation of America, a corporation of Delaware Filed Dec. 3, 1958, Ser. No. 777,954

1 Claim. (Cl. 315—3.6)

This invention relates to traveling wave tubes and particularly to such tubes employing both backward wave oscillator and forward wave amplifier principles to provide a high efficiency microwave tube having substantially constant power level output characteristics.

The conventional backward wave oscillator possesses a highly desirable advantage over the other kinds of microwave oscillators in that the frequency can be electronically tuned over a very wide range. A serious disadvantage, however, exists with the backward wave oscillator due to its nonuniform output characteristic wherein the power output level varies as the frequency is varied. A conventional backward wave oscillator tube has a rising power output characteristic which may be manifest by a power increase in the order of 1 to 20 when the frequency is increased over a range of 1 to 2. This nonuniformity of output is quite undesirable, particularly if the oscillator is operated at a high power level.

In addition to the disadvantage of nonuniformity of output, the conventional backward wave oscillator finds disadvantage in its inherently low efficiency due to the fact that it operates on a spatial harmonic field which gives relatively low impedance.

It is therefore an object of my invention to provide a new and improved traveling wave tube having high efficiency and a relatively constant power output characteristic.

To this end, an object of my invention is to provide an improved high efficiency, substantially constant power output microwave mixer tube employing both backward wave oscillator and forward wave amplifier traveling wave interaction with a single electron beam.

Briefly, according to my invention a single electron beam is caused to interact with traveling waves on two separate slow wave structures according to backward wave oscillator and forward wave amplifier principles. The two slow wave structures are arranged for electrically cascaded operation. In this way the low efficiency and rising output characteristic of the backward wave oscillator interaction is compensated respectively by the amplification and slumping output characteristic of forward wave amplifier interaction.

Figure 1:
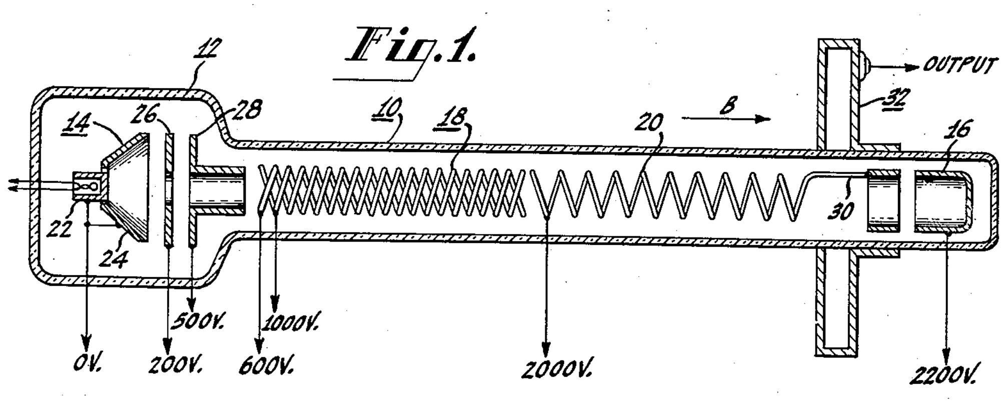
Fig. 1 is a longitudinal section view of a preferred embodiment of my invention.

In Fig. 1 is shown a traveling wave oscillator tube 10 which includes an elongated vacuum envelope 12 containing an electron gun 14 at one end and an electron collector electrode 16 at the other end which define therebetween an electron beam path. Disposed along and around the electron beam path in coaxial, tandem relation are two slow wave propagating structures 18 and 20 which by way of example only are shown to comprise, respectively, a pair of bifilar helix conductors and a simple helix conductor. The slow wave structures 18 and 20 need not be of the helix type, but rather may take any suitable form known to the art. For example, periodic structures of the disk loaded or folded wave guide type may be used. In operation of the tube 10 electrons are emitted from a cathode 22 of the electron gun 14 and are focused by a shield electrode 24 into an electron beam and accelerated toward the collector 16 by a pair of anode electrodes 26 and 28.

The bifilar helix structure 18 is suitably constructed and operated for wave generation interaction with the electron beam passing therethrough according to conventional backward wave oscillator principles. As such, traveling waves are set up on the conductors on the bifilar helix structure 18 and travel in the direction opposite that of the electron beam, that is, toward the electron gun end of the bifilar helix structure 18. These traveling waves cause a corresponding velocity modulation of the electron beam as it passes through the bifilar helix 18. As is well known, in conventional backward wave oscillator operation, wave amplitude along the wave propagating structure increases in the direction toward the electron gun. Theoretically, at the far end of the wave propagating structure of a backward wave oscillator, the energy of the waves and the modulation of the beam are substantially zero. However, not all of the modulation of the electron beam is dissipated along the extent of the wave propagating structure, and actually the electron beam emerges from the far end of the propagating structure with some discrete, although small, amount of velocity modulation. It is this small modulation remaining in the electron beam that is utilized to obtain an output from the tube 10.

The simple helix second slow wave propagating structure 20 is provided at its end adjacent the electron collector 16 with output coupling means comprising a straight section 30 of the helix 20 and an associated wave guide 32. The second slow wave propagating structure 20 is suitably constructed and operated for conventional forward wave amplifying interaction with the electron beam passing therethrough. To this end, signal input to the amplifier helix 20 is provided by the small amount of velocity modulation remaining in the electron beam as it emerges from the bifilar oscillator helix 18. The slightly modulated electron beam entering the amplifier helix 20 creates a signal voltage wave on the helix 20 which travels therealong in the direction of the electron beam and interacts therewith according to known forward wave amplifying interaction principles. The amplified version of the signal is coupled from the helix 20 by the wave guide coupling arrangement 30—32 for utilization externally of the tube 10. It can thus be seen that according to the operation of the tube 10 a single electron beam first experiences backward wave interaction along a first slow wave structure and then forward wave interaction along a second slow wave structure. In this way cascading of backward wave oscillator interaction and forward wave amplifying interaction is obtained.

In order to obtain the above-described type of wave interaction on the two helix structures 18 and 20, the two structures are appropriately constructed according to known design principles and operated with suitable voltages applied thereto. One such set of suitable voltages are indicated in Fig. 1 as: cathode 22, 0 volts; anodes 26 and 28, 200 and 500 volts respectively; the two conductors of the bifilar helix structure 18, 600 and 1000 volts, the simple helix 20, 2000 volts; and collector 16, 2200 volts. These voltages are given only as examples and may be adjusted to obtain different desired conditions of operation.

Figure 2:
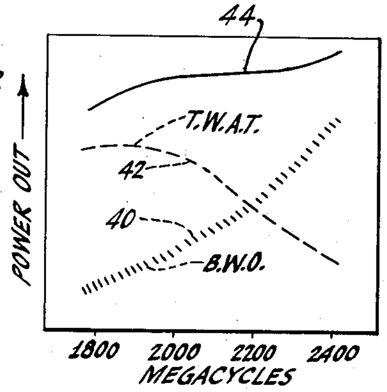
Fig. 2 is a graph illustrating the nature of compensation effected by the apparatus of Fig. 1.

The curves of Fig. 2 best illustrated the effects of the cascaded oscillation-amplification operation. In the graph of Fig. 2 frequency is plotted as an abscissa measurement and power output as an ordinate measurement. Curve 40 graphically illustrates the normal rising output characteristic of the conventional backward wave oscillator and curve 42 the normal slumping output characteristic of the conventional forward wave amplifier. It can be seen that as frequency increases from 1800 to 2400 megacycles, the power output of the conventional backward wave oscillator may also increase from a minimum to a maximum for that given frequency range. On the other hand curve 42 shows that for the conventional forward wave amplifier tube power output generally decreases over a frequency range of 2000 to 2400 megacycles. Thus, each of these two types of traveling wave operations considered separately, has an inherent variable output characteristic of undesirable nature. Curve 44 illustrates the more desirable nature of power output verses frequency according to the tube 10 where oscillator and amplifier wave interaction structures are electrically cascaded. As the oscillator section is tuned, for example, from 2200 megacycles to 2000 megacycles, the degree of beam modulation emerging from the bifilar helix 18 drops off. However, over this same frequency range the efficiency or gain of the amplifier section of the tube increases. The opposite characteristics of the oscillator and amplifier portions of the tube are such that they substantially compensate each other. Accordingly, a relatively constant output is obtained from the tube 10 as it is tuned throughout its normal operating frequency range. Not only is a constant output characteristic obtained, but also a much higher power output level. This is illustrated in Fig. 2 by the fact that the output curve 44 of tube 10 indicates a higher overall power output than either of the individual curves 40 or 42. In fact the power output curve 44 approximately represents the sum of the power output of the individual curves 40 and 42.

Figure 3:
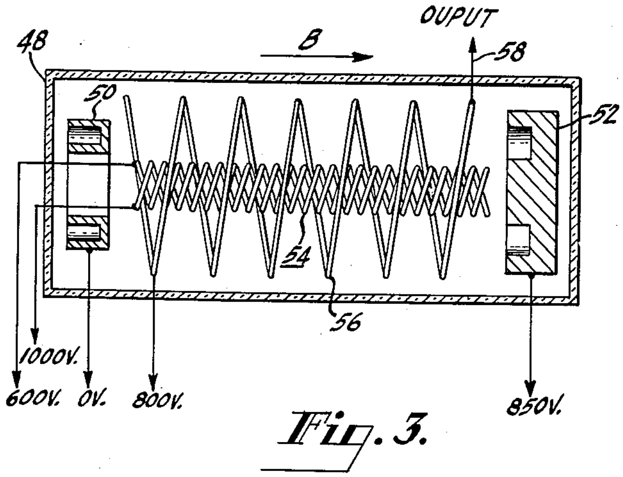
Fig. 3 is a schematic longitudinal section view of another representative embodiment of my invention.

Fig. 3 illustrates a modification in which the backward wave oscillator and the forward wave amplifier slow wave structures are arranged concentrically with each other. Unlike the embodiment of Fig. 1, the modification of Fig. 3 does not result in a physical tandem arrangement. However, from the following description of this modification, it will be appreciated that electrical cascading of operational principles is obtained.

In the device of Fig. 3 there is provided within an envelope 48 an annular cathode 50 and a collector electrode 52 between which a hollow electron beam is projected along a hollow beam path. Disposed concentrically inside the hollow beam path is a bifilar helix structure 54. A simple helix 56 is provided concentrically surrounding the hollow beam path. As such, the hollow electron beam projected from the cathode 50 to the collector 52 passes along and around the bifilar helix 54 and inside the simple helix 56. Accordingly, an arrangement is provided wherein a single electron beam experiences both backward wave oscillator interaction with backward traveling waves on the bifilar helix and forward wave amplifier interaction with forward traveling waves on the simple helix. One representative set of operating voltages given by way of example only for obtaining such interaction is shown in Fig. 3 as: cathode 50, 0 volts; simple helix 56, 800 volts; the two conductors of the bifilar helix structure 54, 600 and 1000 volts; and collector 52, 850 volts. As with the tube 10 of Fig. 1, the two helix structures are so constructed as to promote the desired type of wave interaction of the electron beam therewith.

With suitable voltages applied, a traveling wave created on the bifilar helix structure 54 moves in the direction toward the cathode 50 consistent with backward wave oscillator principles. The backward traveling wave on the bifilar helix structure 54 increases in amplitude as it moves toward the cathode 50 and, as such, the electron beam has its greatest modulation at the end of the bifilar helix 54 near the cathode. It is the modulation contained in the electron beam at the cathode end of the two helix structures 54 and 56 which serves as a signal input for forward wave amplifying interaction with respect to the simple helix 56. Thus, a signal created on the simple helix adjacent the cathode 50 by the modulated electron beam will travel along the simple helix 56 toward the collector 52. During such travel, conventional forward wave amplifying interaction between that signal and the electron beam results in an amplified version of the signal being made available at the collector end of the simple helix 56 for output via an output line 58.

In the manner described above it will be appreciated that this output comprises an amplified version of the RF signal generated by virtue of backward wave oscillator interaction between the electron beam and the signal created on the bifilar helix structure 54. Accordingly, a high power RF oscillator is provided. Moreover, the apparatus illustrated in Fig. 3 obtains the additional advantage described with respect to the tube 10 of Fig. 1 wherein a rising output characteristic of backward wave oscillator operation substantially compensates for the slumping output characteristic of forward wave amplifier operation.

As hereinbefore stated, it will be appreciated that in the apparatus of Fig. 3 oscillation and amplification operational principles are electrically cascaded through the use of a single electron beam. This is true since a signal wave is generated on the bifilar helix structure 54 and travels therealong in growing relation and is then coupled through the electron beam to the simple helix 56 for forward wave amplifying interaction to provide an output at the collector end of the simple helix. It will also be appreciated that by virtue of the concentricity of wave propagating structures 54 and 56, the signal input for forward wave amplification is taken from the high power level end of the oscillator helix structure 54 rather than the low power level end as is the case in the tube 10 of Fig. 1. Accordingly, an even higher power output is possible in the concentric arrangement of Fig. 3 than is possible according to the coaxial tandem relation of the slow wave structures embodied in the tube 10 of Fig. 1.

Figure 4:
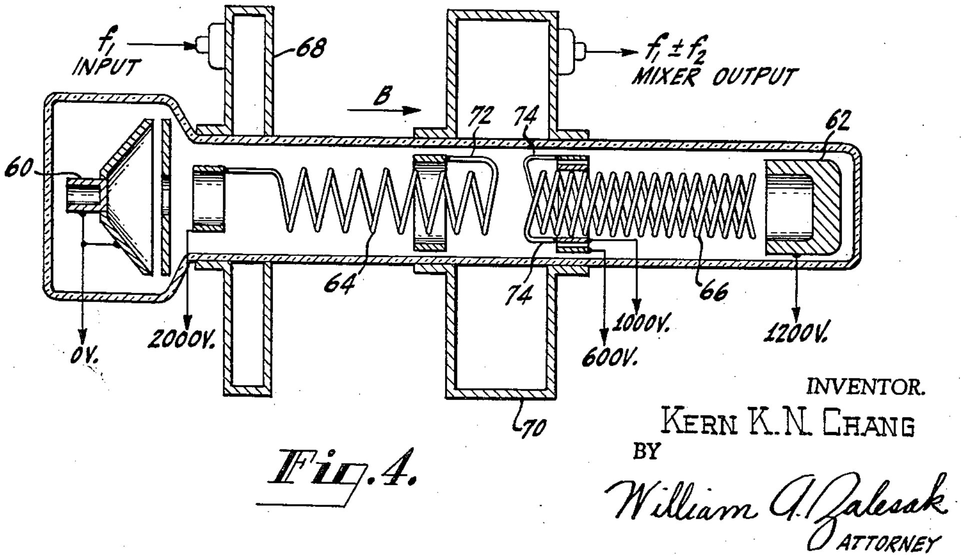
Fig. 4 is a longitudinal section view of a microwave frequency mixer tube employing the teachings of my invention.

Fig. 4 illustrates a utilization of the basic principle of Figs. 1–3 as incorporated in frequency mixer apparatus in accordance with my invention. As in the devices of Figs. 1 and 3, a single electron beam is caused to experience both forward wave amplifying interaction and backward wave oscillator interaction with respect to two separate slow wave propagating structures. In the apparatus of Fig. 4 there is provided a cathode 60 and a collector electrode 62 between which a single electron beam is projected along a beam path. Disposed along the path in coaxial end-to-end relation is a simple helix 64 adjacent the cathode 60 and a bifilar helix structure 66 adjacent the collector 62. Signal input means 68 is provided at the cathode end of the simple helix 64 and may, for example, comprise a wave guide coupling structure. A second wave guide coupling structure 70 is provided at the adjacent ends of the simple and bifilar helix structures 64 and 66 and serves to couple output signals from both of these helix structures. As such, the output wave guide structure 70 serves also as a frequency mixer device from which an output signal is available.

In operation, suitable voltages are applied to the various electrodes including the two appropriately constructed slow wave structures such that forward wave amplifying interaction is obtained between the electron beam and signal waves fed to the simple helix 64, and wave generation by backward wave interaction is obtained with respect to the bifilar helix structure 66. Suitable voltages for providing such operation are indicated as follows: cathode 60, 0 volts; simple helix 64, 2000 volts; the two conductors of the bifilar helix structure 64, 600 and 1000 volts; and collector 62, 1200 volts. These voltages are given by way of example only and may be individually altered according to known practices to obtain different desired conditions of operation.

As noted in Fig. 4, an input signal of frequency $f_1$ may be applied to the input wave guide coupler 68. If, then, the backward wave oscillator bifilar helix structure 66 is operated to generate a signal of frequency $f_2$, outputs will be applied respectively from the helix structure 64 and 66 in the form of signals of frequency $f_1$ and $f_2$. As such, and according to well-known heterodyning principles, an output will be available from the output mixer wave guide 70 as the sum of $f_1$ and $f_2$ as the difference between $f_1$ and $f_2$.

In the apparatus of Fig. 4, forward wave amplifying interaction is established with respect to the simple helix 64 between the electron beam and the input signal $f_1$ coupled from the input wave guide 68. Accordingly, a forward traveling wave is established in the direction of the electron beam along the simple helix 64 and appears as an amplified version at a coupling antenna 72. Conventional backward wave oscillator signal generation interaction is established with respect to the bifilar helix structure 66 by the electron beam passing therethrough. A signal wave is thereby created on the bifilar helix structure 66 which travels in a backward direction with respect to the electron beam. Thus, a generated frequency signal $f_2$ is available for output at a pair of backward wave oscillator antennas 74. Coupling of the two signals on the output antennas 72 and 74 to the output mixer wave guide 70 is achieved according to well-known techniques and principles.

What is claimed is:

A traveling wave frequency mixing tube comprising electron gun means for projecting an electron beam along a beam path, electron collector means spaced from said electron gun means for collecting said electron beam, a forward wave propagating structure disposed along said beam path adjacent to said electron gun means, a backward wave propagating structure disposed along said beam path adjacent said electron collector means in end to end relation with said forward wave propagating structure, signal input means coupled to said forward wave propagating structure at the end thereof adjacent to said electron gun means, and signal mixing and output means coupled to both said forward wave and said backward wave propagating structures at their adjacent ends.

References Cited in the file of this patent

UNITED STATES PATENTS

| | | |
|---|---|---|
| 2,753,481 | Ettenberg | July 3, 1956 |
| 2,814,756 | Kenmoku | Nov. 26, 1957 |
| 2,824,256 | Pierce et al. | Feb. 18, 1958 |
| 2,824,257 | Branch | Feb. 18, 1958 |
| 2,840,752 | Cutler et al. | June 24, 1958 |
| 2,891,191 | Heffner et al. | June 16, 1959 |